US011889911B2

(12) United States Patent
Lee

(10) Patent No.: US 11,889,911 B2
(45) Date of Patent: Feb. 6, 2024

(54) SKIN CARE DEVICE

(71) Applicant: Soontack Lee, Seoul (KR)

(72) Inventor: Soontack Lee, Seoul (KR)

( * ) Notice: Subject to any disclaimer, the term of this patent is extended or adjusted under 35 U.S.C. 154(b) by 673 days.

(21) Appl. No.: 17/046,434

(22) PCT Filed: Apr. 12, 2019

(86) PCT No.: PCT/KR2019/004398
§ 371 (c)(1),
(2) Date: Oct. 9, 2020

(87) PCT Pub. No.: WO2019/199095
PCT Pub. Date: Oct. 17, 2019

(65) Prior Publication Data

US 2021/0161276 A1 Jun. 3, 2021

(30) Foreign Application Priority Data

Apr. 13, 2018 (KR) ........................ 10-2018-0043243
May 17, 2018 (KR) ........................ 10-2018-0056348

(51) Int. Cl.
*A45D 34/00* (2006.01)
*A61H 7/00* (2006.01)
(Continued)

(52) U.S. Cl.
CPC ............. *A45D 34/04* (2013.01); *A45D 40/26* (2013.01); *A61H 7/003* (2013.01); (Continued)

(58) Field of Classification Search
CPC .. A45D 34/04; A45D 40/26; A45D 2034/002; A45D 2040/0006; A61H 7/003; A61H 2201/105; A61H 9/0028
See application file for complete search history.

(56) References Cited

U.S. PATENT DOCUMENTS 3,720,204 A * 3/1973 Wojtowicz ........... A61H 9/0028
601/160
4,222,676 A 9/1980 Roth
(Continued)

FOREIGN PATENT DOCUMENTS

KR 20-0290105 9/2002
KR 20-2008-0005018 10/2008
(Continued)

OTHER PUBLICATIONS

International Search Report, with English translation, for International Application No. PCT/KR2019/004398, dated Jul. 16, 2019.
(Continued)

*Primary Examiner* — Timothy A Stanis
(74) *Attorney, Agent, or Firm* — KILE PARK REED & HOUTTEMAN PLLC

(57) ABSTRACT

A skin care device includes a handle extended along a lengthwise direction; a head portion provided at an end portion of the handle, and including an accommodating portion in which an accommodating space is formed by a bottom portion and a main lateral wall portion extended from the bottom portion along a height direction; and a massage member detachably mounted to the head portion and including a contact surface portion to come into contact with a skin, at least one partition wall extended protruding from a rear of the contact surface portion and dividing the accommodating space into a plurality of accommodating spaces when the massage member is mounted to the head portion, and a plurality of through holes distributed and arranged in the contact surface portion and allowing the plurality of accommodating spaces divided by the partition wall to communicate with the outside.

1 Claim, 6 Drawing Sheets

(51) Int. Cl.

| | |
|---|---|
| ***A45D 34/04*** | (2006.01) |
| ***A45D 40/26*** | (2006.01) |
| *A45D 40/00* | (2006.01) |

(52) U.S. Cl.

CPC .................. *A45D 2034/002* (2013.01); *A45D 2040/0006* (2013.01); *A61H 2201/105* (2013.01)

(56) References Cited

U.S. PATENT DOCUMENTS

| | | | | |
|---|---|---|---|---|
| 5,813,785 | A * | 9/1998 | Baudin ................ | B65D 83/285 401/266 |
| 6,261,014 | B1 * | 7/2001 | Altobellis ............ | A45D 34/041 401/6 |
| 2006/0285910 | A1 * | 12/2006 | Khubani ................ | A61H 7/005 401/6 |
| 2007/0095362 | A1 * | 5/2007 | Koopah .................. | B08B 7/028 134/1 |
| 2007/0243005 | A1 * | 10/2007 | Sviesa .................... | A61H 7/005 401/4 |
| 2008/0205963 | A1 * | 8/2008 | Schmidig ........... | A46B 11/0013 401/6 |

FOREIGN PATENT DOCUMENTS

| | | |
|---|---|---|
| KR | 10-2013-0099856 | 9/2013 |
| KR | 10-1468993 | 12/2014 |
| KR | 10-2016-0051221 | 5/2016 |

OTHER PUBLICATIONS

Written Opinion, with English translation, for International Application No. PCT/KR2019/004398, dated Jul. 16, 2019.

* cited by examiner

SKIN CARE DEVICE

CROSS REFERENCE TO RELATED APPLICATIONS

This application is a national entry of International Application No. PCT/KR2019/004398, filed on Apr. 12, 2019, which claims under 35 U.S.C. § 119(a) and 365(b) priority to and benefits of Korean Patent Application Nos. 10-2018-0043243, filed on Apr. 13, 2018, and 10-2018-0056348, filed on May 17, 2018 in the Korean Intellectual Property Office, the entire contents of which are hereby incorporated by reference.

TECHNICAL FIELD

The disclosure relates to a skin care device.

BACKGROUND ART

To make a skin smooth, modern people applies and massages a skin care material with relatively high viscosity, such as lotion, cream, etc. and/or a skin care material with relatively low viscosity, such as oil, milk, vinegar diluted solution, green tea water, lemon water, wine, starchy water, etc. onto the skin. However, it is difficult for people to apply the skin care material to their own back portions by themselves because a human body has a structure that a palm can hardly reach the back.

Specifically, people can rub the lotion, the cream or the like skin care material, of which viscosity is relatively high, on their own backs with a long stick. However, people can hardly apply and massage the oil, the milk, the vinegar diluted solution, the green tea water, the lemon water, the wine, the starchy water or the like skin care material, of which viscosity is relatively low, onto their own backs by themselves because it tends to flow down.

Meanwhile, with increase of one-person households and growth of interest in skin care, various products for helping people to take care their own back portions by themselves, for example, a body brush, a lotion applicator, etc. have been individually on the market. Therefore, there is a problem that various skin care products for the back portion need to be individually purchased and stored.

Technical Problem

An aspect of the disclosure is to provide a skin care device which has a relatively simple configuration allowing people to easily apply not only a skin care material with relatively high viscosity, such as lotion, cream, etc. but also a skin care material with relatively low viscosity, such as oil, milk, vinegar diluted solution, green tea water, lemon water, wine, starchy water, etc. onto their own back portions.

Another aspect of the disclosure is to provide a skin care device which has a relatively simple configuration for variously taking care of a back portion.

Technical Solution

According to an embodiment of the disclosure, a skin care device includes: a handle extended along a lengthwise direction; a head portion provided at an end portion of the handle, and including an accommodating portion in which an accommodating space is formed by a bottom portion and a main lateral wall portion extended from the bottom portion along a height direction; and a massage member detachably mounted to the head portion and including a contact surface portion to come into contact with a skin, at least one partition wall extended protruding from a rear of the contact surface portion and dividing the accommodating space into a plurality of accommodating spaces when the massage member is mounted to the head portion, and a plurality of through holes distributed and arranged in the contact surface portion and allowing the accommodating spaces divided by the partition wall to communicate with the outside.

Here, the accommodating portion may include an inner lateral wall portion extended from the bottom portion along the height direction inside the main lateral wall portion in a radial direction so that the accommodating space can be divided into an outside accommodating space and an inside accommodating space, and the contact surface portion may include the plurality of through holes so that each of the outside accommodating space and the inside accommodating space can communicate with an outside, thereby allowing a user to fill the inside accommodating space with the skin care material when a relatively small amount of skin care material is needed, but fill both the outside accommodating space and the inside accommodating space with the skin care material when a relatively large amount of skin care material is needed.

Further, the partition wall may be inserted between the main lateral wall portion and the inner lateral wall portion and extended protruding from the rear of the contact surface portion so that the accommodating space between the main lateral wall portion and the inner lateral wall portion can be divided into the plurality of spaces along a circumferential direction, thereby even discharging the skin care material through a relatively large region without being discharged through only certain through holes 511 as forced downward by gravity when a user uses the skin care device.

Further, the massage member may include an outward leakage preventer protruding from the rear of the contact surface portion to come into contact with the main lateral wall portion, and an inward leakage preventer protruding from the rear of the contact surface portion inside the outward leakage preventer in a radial direction to come into contact with the inner lateral wall portion, thereby preventing the skin care material accommodated in the inside accommodating space from leaking toward the outside accommodating space, and preventing the skin care material accommodated in the outside accommodating space from leaking toward the outside of the accommodating portion.

The massage member may include an outward leakage preventer protruding from the rear of the contact surface portion to come into contact with an internal diameter surface of the main lateral wall portion, and an inward leakage preventer protruding from the rear of the contact surface portion inside the outward leakage preventer in a radial direction to come into contact with an external diameter surface of the inner lateral wall portion, and the partition wall may connect the inward leakage preventer and the outward leakage preventer, thereby achieving a relatively compact structure with which the accommodating spaces are partitioned while the skin care material accommodated in the inside accommodating space and the outside accommodating space is being prevented from leaking to another space.

Further, the partition wall may include an end portion to come into contact with the bottom portion of the accommodating portion when the massage member is mounted to the head portion, thereby preventing the skin care material accommodated in the accommodating spaces divided by the partition wall from moving to any other divided accommodating spaces.

Meanwhile, the through hole includes a widening section in which a diameter of the through hole becomes larger from the contact surface portion toward the rear of the contact surface portion, and it is thus advantageous to discharge the liquid skin care material accommodated in the accommodating portion to the outside by gravity.

Another embodiment of the disclosure may be achieved by mounting a brush member with a plurality of fibers or another kind of member to the head portion.

Advantageous Effects

A skin care device according to the disclosure has a relatively simple configuration allowing people to easily apply not only a skin care material with relatively high viscosity, such as lotion, cream, etc. but also a skin care material with relatively low viscosity, such as oil, milk, vinegar diluted solution, green tea water, lemon water, wine, starchy water, etc. onto their own body including back portions.

The skin care material with relatively high viscosity, such as the lotion, the cream, etc. is used as coated on the massage member, and the skin care material with relatively low viscosity, such as the oil, the milk, the vinegar diluted solution, the green tea water, the lemon water, the wine, the starchy water, etc. is used as filled in the accommodating portion.

The skin care device according to the disclosure may be used in variously taking care of back portions by mounting different kinds of members such as a brush member with a plurality of fibers implanted in the head portion, etc.

BEST MODE

Figure 1:
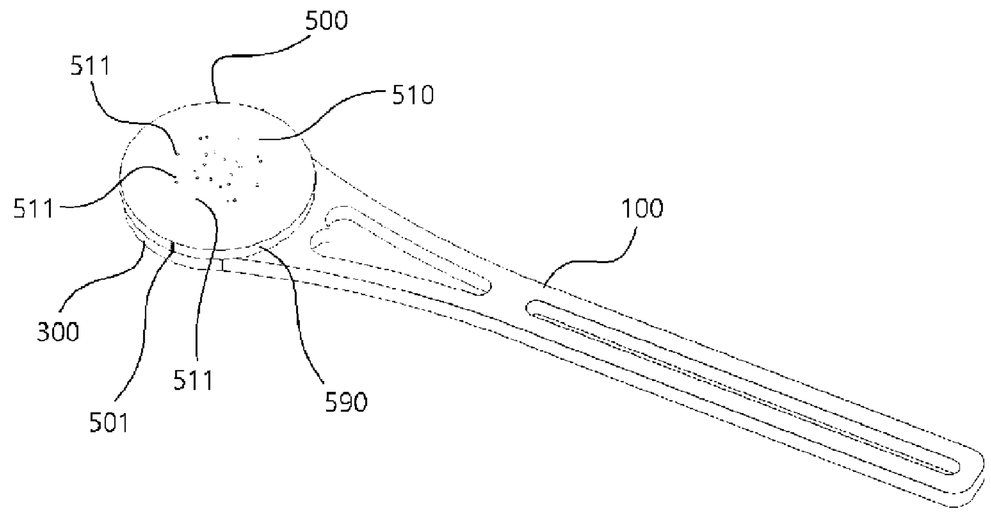
FIG. 1 is a perspective view of a skin care device according to the disclosure.
Figure 2:
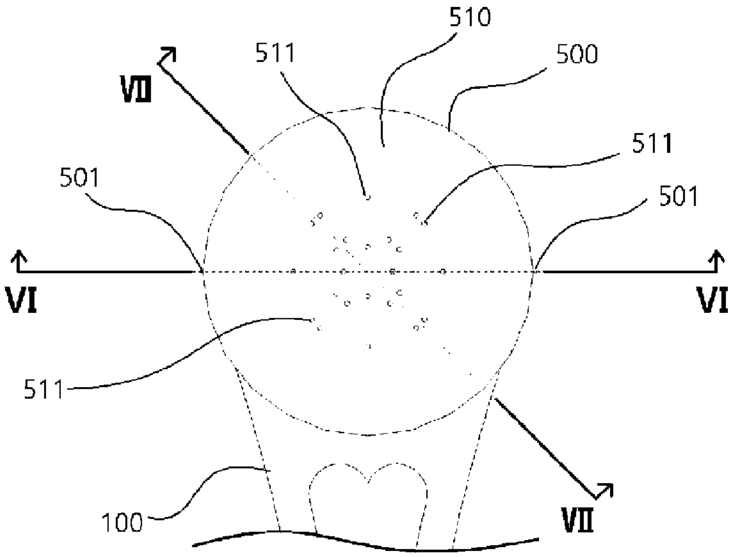
FIG. 2 is a front view of a massage member side.

FIG. 1 is a perspective view of a skin care device according to the disclosure, and FIG. 2 is a front view at a side of a massage member 500. As shown therein, the skin care device includes a handle 100 extended along a lengthwise direction, a head portion 300 provided at an end portion of the handle 100 and shaped like a circle, and a massage member 500 detachably coupled to the head portion 300. The massage member 500 includes a contact surface portion 510 enlarged to be in contact with a skin. The contact surface portion 510 is formed with a plurality of through holes 511 through which a skin care material is discharged. The plurality of through holes 511 are distributed and arranged in the contact surface portion 510. The contact surface portion 510 may include only one through hole 511.

Figure 3:
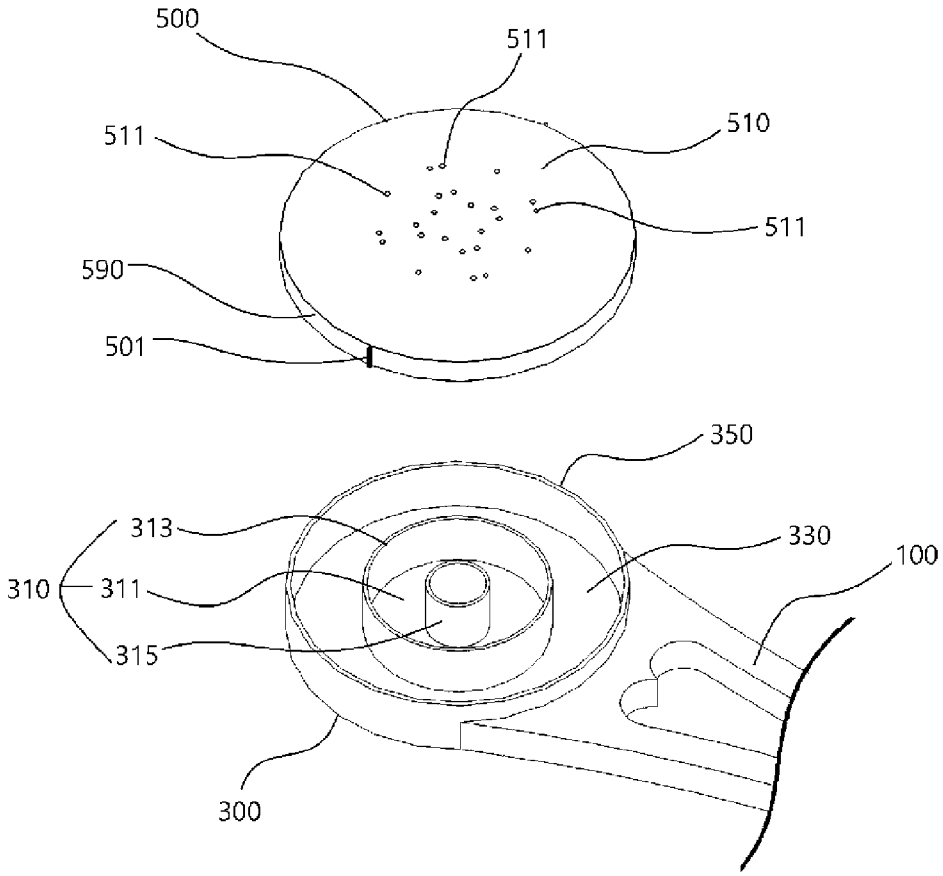
FIG. 3 is an enlarged perspective view of a head portion side in which a massage member is separated from a head portion.

FIG. 3 is an enlarged perspective view at a side of the head portion 300 in which the massage member 500 is separated from the head portion 300. As shown in FIG. 3, the head portion 300 includes an accommodating portion 310 shaped like a container and capable of accommodating a liquid skin care material. The accommodating portion 310 includes a bottom portion 311, and a main lateral wall portion 313 extended from the bottom portion 311 along a height direction and having a circular cross-section. Further, the accommodating portion 310 includes an inner lateral wall portion 315 having a circular cross-section and extended from the bottom portion 311 along the height direction inside the main lateral wall portion 313 in a radial direction. The main lateral wall portion 313 and the inner lateral wall portion 315 are annularly shaped like an end-to-end circular ring. Thus, an inside accommodating space is formed inside the inner lateral wall portion 315, and an outside accommodating space is formed between the main lateral wall portion 313 and the inner lateral wall portion 315. The accommodating portion 310 may include only the bottom portion 311 and the main lateral wall portion 313 without the inner lateral wall portion 315. Alternatively, the main lateral wall portion 313 and the inner lateral wall portion 315 may have various shapes such as a polygonal shape, an oval shape, etc. The accommodating portion 310 may be made of a different material from that of the head portion 300 and detachably coupled to the head portion 300.

The head portion 300 includes an extended portion 330 radially extended from the accommodating portion 310. The extended portion 330 enlarges the surface area of the massage member 500. The head portion 300 includes a coupling guide portion 350 extended from an outer edge of the extended portion 330 along the height direction of the main lateral wall portion 313. The head portion 300 may include only the accommodating portion 310 without the extended portion 330. The coupling guide portion 350, the main lateral wall portion 313, and the inner lateral wall portion 315 are all extended along the height direction and extended in parallel with one another.

The massage member 500 is detachably coupled to the head portion 300. The massage member 500 includes the contact surface portion 510 to be in contact with a skin, and a coupling portion 590 extended from an outer edge of the contact surface portion 510 along the height direction. The thickness of the contact surface portion 510 may not be greater than 2 mm. When the massage member 500 is mounted to the head portion 300, the massage member 500 includes the plurality of through holes 511 arranged in regions corresponding to the inside accommodating space and the outside accommodating space formed by the main lateral wall portion 313 and the inner lateral wall portion 315 of the accommodating portion 310 and allowing the inside accommodating space and the outside accommodating space to communicate with the outside. The massage member 500 is mounted to the head portion 300 as the coupling portion 590 is coupled to the coupling guide portion 350. The coupling portion 590 and the coupling guide portion 350 may be coupled by various methods such as fitting coupling, screw coupling, etc. The coupling portion 590 may be inserted inside the coupling guide portion 350. The coupling portion 590 is marked with a position guide protrusion. The position guide protrusion 501 is illustrated on the accompanying drawings to describe a position relationship between the head portion 300 and the configurations of the massage member 500 and the through holes 511

Figure 4:
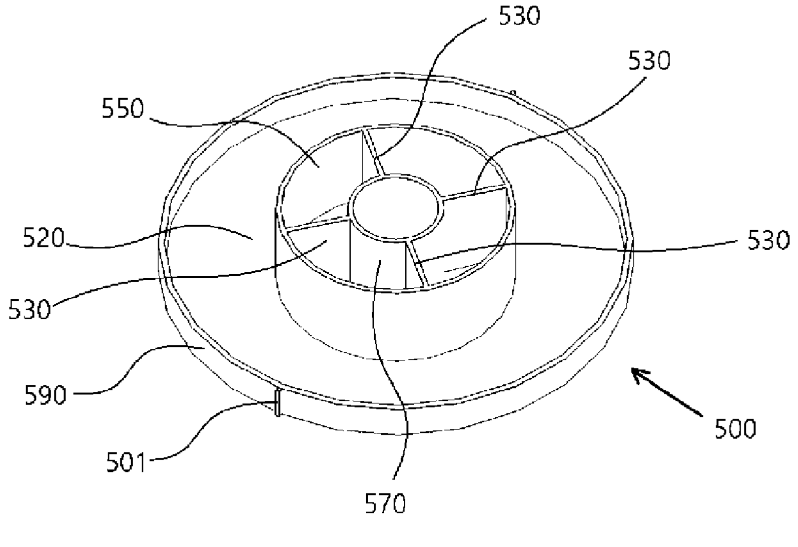
FIG. 4 is a perspective view of a rear side of the massage member.
Figure 5:
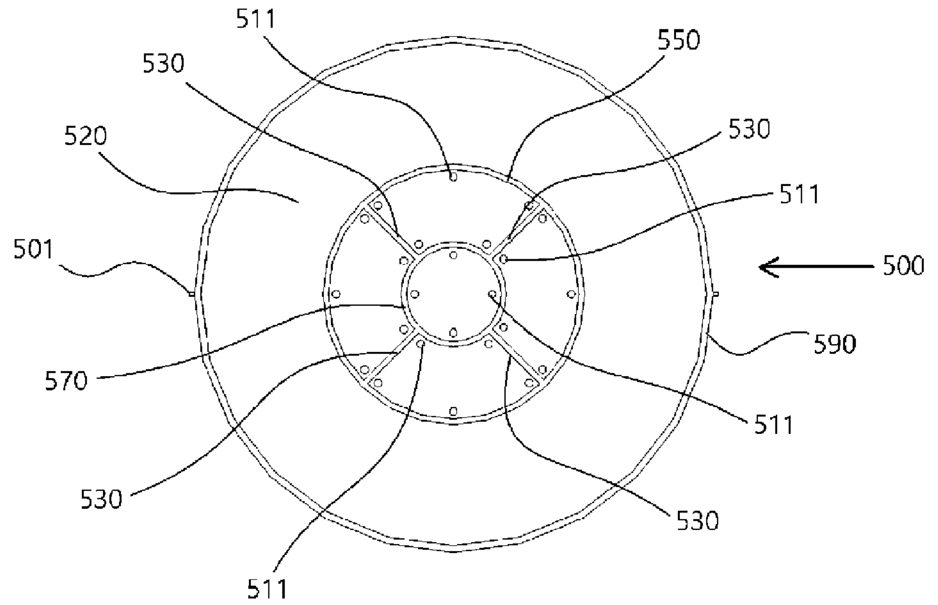
FIG. 5 is a rear view of the massage member.

FIG. 4 is a perspective view at a side of a rear 520 of the massage member 500, and FIG. 5 is a rear view of the massage member 500. As shown therein, the massage member 500 includes an outward leakage preventer 550 protruding from the rear 520 of the contact surface portion 510 so as to be in contact with the main lateral wall portion 313, and an inward leakage preventer 570 protruding from the rear 520 of the contact surface portion 510 inside the outward leakage preventer 550 in the radial direction so as to be in contact with the inner lateral wall portion 315. The outward leakage preventer 550 has an outer diameter corresponding to an inner diameter of the main lateral wall portion 313 in order to be in contact with the internal diameter surface of the main lateral wall portion 313, and the inward leakage preventer 570 has an inner diameter corresponding to an outer diameter of the inner lateral wall portion 315 in order to be in contact with the external diameter surface of the inner lateral wall portion 315. The outward leakage preventer 550 comes into contact with the main lateral wall portion 313 along the circumference of the main lateral wall portion 313, and the inward leakage preventer 570 comes into contact with the inner lateral wall portion 315 along the circumference of the inner lateral wall portion 315.

When the massage member 500 is mounted to the head portion 300, the massage member 500 includes a plurality of partition walls 530 inserted between the main lateral wall portion 313 and the inner lateral wall portion 315 and protruding from the rear 520 of the contact surface portion 510 so that the accommodating space between the main lateral wall portion 313 and the inner lateral wall portion 315 can be divided into a plurality of spaces along the circumferential direction. The plurality of partition walls 530 is shaped like a plate and intersects with the inward leakage preventer 570 and the outward leakage preventer 550 to be connected to each other. The plurality of partition walls 530 may be arranged at angular intervals of 90 degrees with respect to the center of the massage member 500. The through holes 511 are evenly distributed and arranged so that the accommodating spaces of the accommodating portion 310 divided by the partition walls 530 can communicate with the outside.

The outward leakage preventer 550 may be in contact with the external diameter surface or the upper end surface of the main lateral wall portion 313, and the inward leakage preventer 570 may be in contact with the internal diameter surface or the upper end surface of the inner lateral wall portion 315. The partition wall 530 may be inserted between the main lateral wall portion 313 and the inner lateral wall portion 315 without connecting the outward leakage preventer 550 and the inward leakage preventer 570. The massage member 500 may not include the outward leakage preventer 550 and the inward leakage preventer 570, but the rear 520 of the contact surface portion 510 may be in contact with the upper end portions of the main lateral wall portion 313 and the inner lateral wall portion 315.

Figure 6:
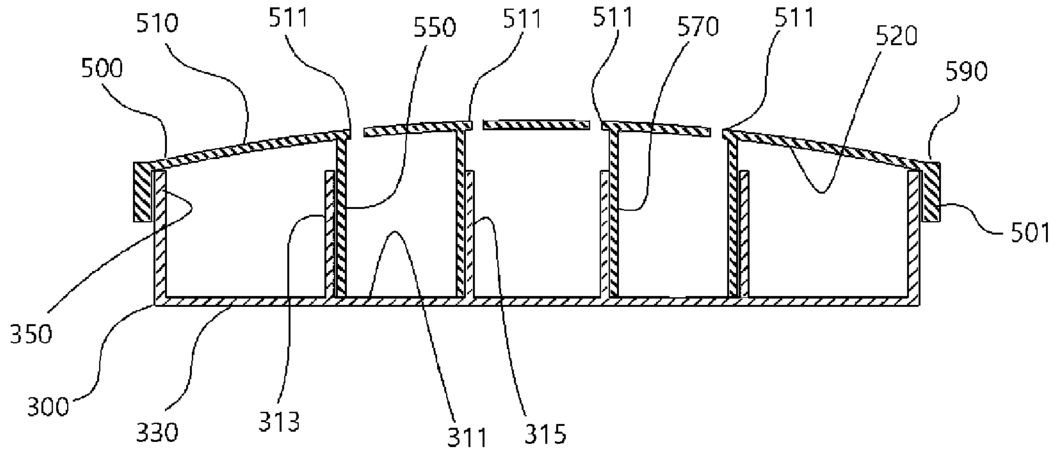
FIG. 6 is a cross-sectional view taken along line VI-VI in FIG. 2.

FIG. 6 is a cross-sectional view taken along line VI-VI in FIG. 2. As shown in FIG. 6, the contact surface portion 510 is curved upward as an arch shape with respect to the head portion 300. Further, the through holes 511 are distributed and arranged so that the inside accommodating space and the outside accommodating space of the accommodating portion 310 can communicate with the outside. The inward leakage preventer 570 and the outward leakage preventer 550 are extended protruding from the rear 520 of the contact surface portion 510 so that their end portions can come into contact with the bottom portion 311. The inward leakage preventer 570 and the outward leakage preventer 550 are longer than the main lateral wall portion 313 and the inner lateral wall portion 315. Thus, the liquid skin care material accommodated in the accommodating space of the accommodating portion 310 is prevented from leaking to any other spaces and discharged to the outside through only the through holes 511. The end portions of the inward leakage preventer 570 and the outward leakage preventer 550 may not be in contact with the bottom portion 311.

The main lateral wall portion 313 and the inner lateral wall portion 315 may have the same height length, and it is therefore advantageous to mount another massage member 500, for example, a brush member 700 (see FIG. 9) to the head portion 300. Nevertheless, the upper end portions of the main lateral wall portion 313 and the inner lateral wall portion 315 may be lengthened to come into contact with the rear 520 of the contact surface portion 510. The bottom portion 311 of the head portion 300 may also have an arch shape like the contact surface portion 510. In this case, the bottom portion 311 may be curved downward.

Figure 7:
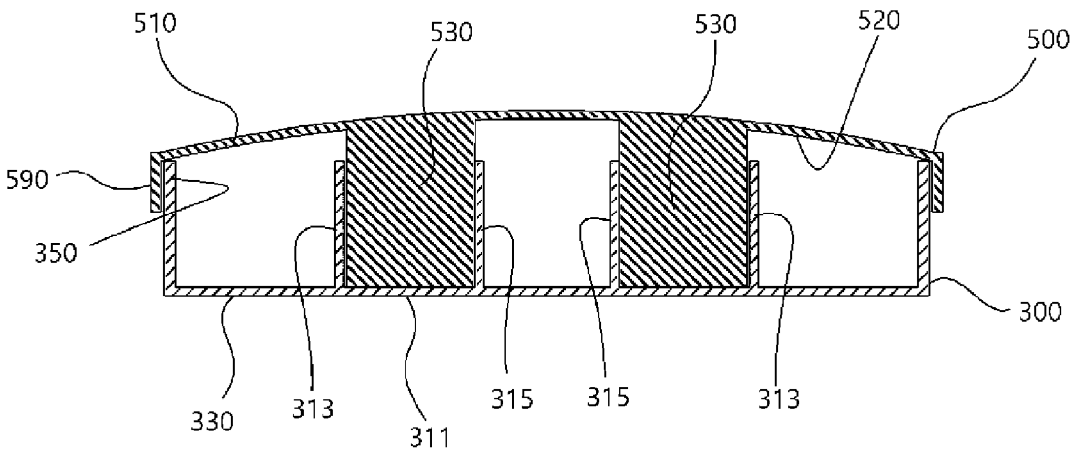
FIG. 7 is a cross-sectional view taken along line VII-VII in FIG. 2.

FIG. 7 is a cross-sectional view taken along line VII-VII in FIG. 2. As shown in FIG. 7, the partition walls 530 are extended protruding from the rear 520 of the contact surface portion 510 and inserted in the accommodating space between the main lateral wall portion 313 and the inner lateral wall portion 315. The partition walls 530 divide the accommodating space between the main lateral wall portion 313 and the inner lateral wall portion 315 into a plurality of accommodating spaces. In other words, the ring-shaped accommodating space formed between the main lateral wall portion 313 and the inner lateral wall portion 315 is divided into a plurality of spaces along the circumferential direction. In this case, the end portion of the partition wall 530 is in contact with the bottom portion 311. Thus, the liquid skin care material filled in the accommodating space between the main lateral wall portion 313 and the inner lateral wall portion 315 is confined in the accommodating space divided by the partition walls 530 and prevented from moving to another accommodating space, thereby being allowed to be discharged to the outside through only the through holes 511 formed in the contact surface portion 510. Therefore, when a user uses the skin care device, the skin care material is evenly discharged through a relatively large region without being discharged through only certain through holes 511 as forced downward by gravity. Of course, a predetermined gap may be formed between the partition wall 530 and the bottom portion 311, and therefore the liquid skin care material may be allowed to partially move between the divisional accommodating spaces formed by the partition walls 530.

Figure 8:
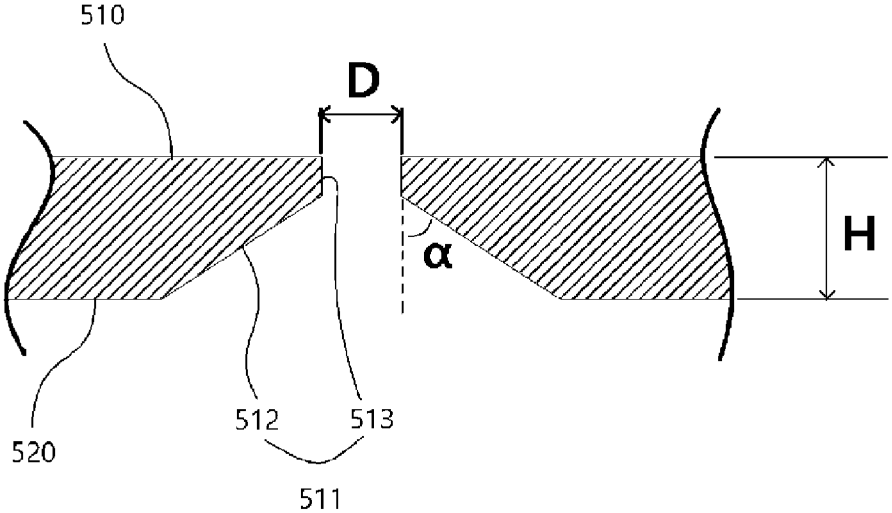
FIG. 8 is an explanation view for explaining a through hole.

FIG. 8 is an explanation view for explaining the through hole 511. Referring to FIG. 8, the through hole 511 has a widening section 512 in which the diameter of the through hole 511 becomes larger from the contact surface portion 510 toward the rear 520. The through hole 511 may have a straight section 513 formed between the contact surface portion 510 and the widening section 512. Through the widening section 512, the liquid skin care material can come relatively close to the surface of the contact surface portion 510, and thus the liquid skin care material is advantageously discharged to the outside by gravity.

The through hole 511 formed on the surface of the contact surface portion 510 may have a diameter D of 1 mm to 2 mm. When the diameter D of the through hole 511 is smaller than 1 mm, the liquid skin care material filled in the accommodating portion 310 may not be discharged to the outside through the through hole 511 or may be discharged so small that it can hardly be used. When the diameter D of the through hole 511 is greater than 2 mm, the liquid skin care material may be discharged through the through hole 511 more than needed to be applied and massaged into a skin, thereby causing a problem that the skin care material is wasted. The contact surface portion 510 adjacent to the through hole 511 may have a thickness H of 3 mm or less. The angle α of the widening section 512 may range from 45 degrees to 75 degrees with respect to a line perpendicular to the contact surface portion 510.

As described above, when a user applies a skin care material with relatively low viscosity, such as oil, milk, vinegar diluted solution, green tea water, lemon water, wine, starchy water, etc. onto a skin, the user fills the accommodating portion 310 with the liquid skin care material and mounts the massage member 500 to the skin care device, and makes the skin care device stands, thereby applying and massaging the skin care material onto the skin while the liquid skin care material is being discharged through the through holes 511 by gravity. In this case, when it is desired to apply a relatively small amount of skin care material to the skin, the skin care material is used as filled in only the inside accommodating space formed by the inner lateral wall portion 315. On the other hand, when it is desired to apply a relatively large amount of skin care material to the skin, the skin care material is used as filled in both the inside accommodating space formed by the inner lateral wall portion 315 and the outside accommodating space formed between the main lateral wall portion 313 and the inner lateral wall portion 315.

Meanwhile, when it is desired to apply a skin care material with relatively high viscosity, such as lotion, cream, etc., the skin care material is rubbed and applied onto the skin as coated on the contact surface portion 510 of the massage member 500.

When the massage member 500 is made of plastic, the skin care material, of which intermolecular attractive force is relatively strong and which has hydrophilic properties based on hydrogen bond, is not easily discharged through the through hole 511. In this case, the skin care material standing in the accommodating space is led to and discharged through the through hole 511 when a hydrophilic object, for example, a skin comes into contact with the through hole 511.

In the skin care device according to the disclosure, the massage member 500 is detachable from the head portion 300. Therefore, various kinds of massage members 500 may be selectively mounted to the head portion 300, so that the skin care device can have various functions. For example, when the brush member 700 (see FIG. 9) having a brushing function is mouthed to the head portion 300, the skin care device may serve as a body brush. Alternatively, a scrubbing member serving as a scrubbing towel may be mounted to the head portion 300.

Figure 9:
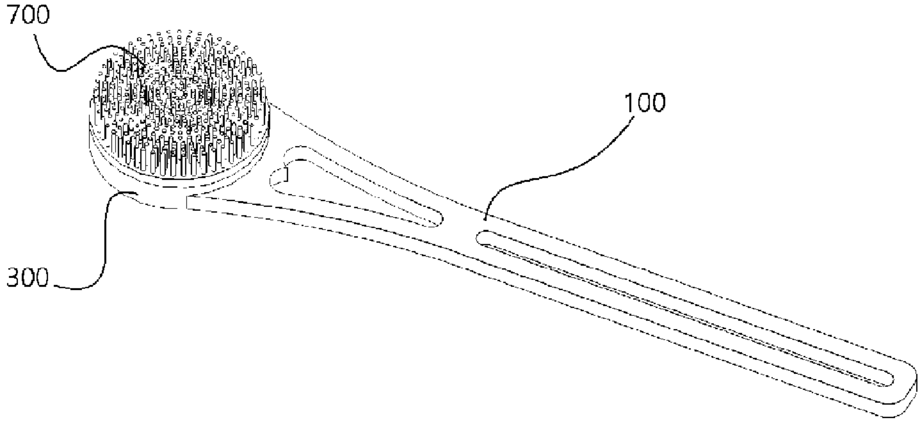
FIG. 9 is a perspective view of a skin care device in which a brush member is mounted to the head portion.

FIG. 9 is a perspective view of a skin care device in which the brush member 700 is mounted to the head portion 300. As shown in FIG. 9, the skin care device of the disclosure may include the head portion 300 to which the brush member 700 having a plurality of fibers 710 is detachably mounted.

Figure 10:
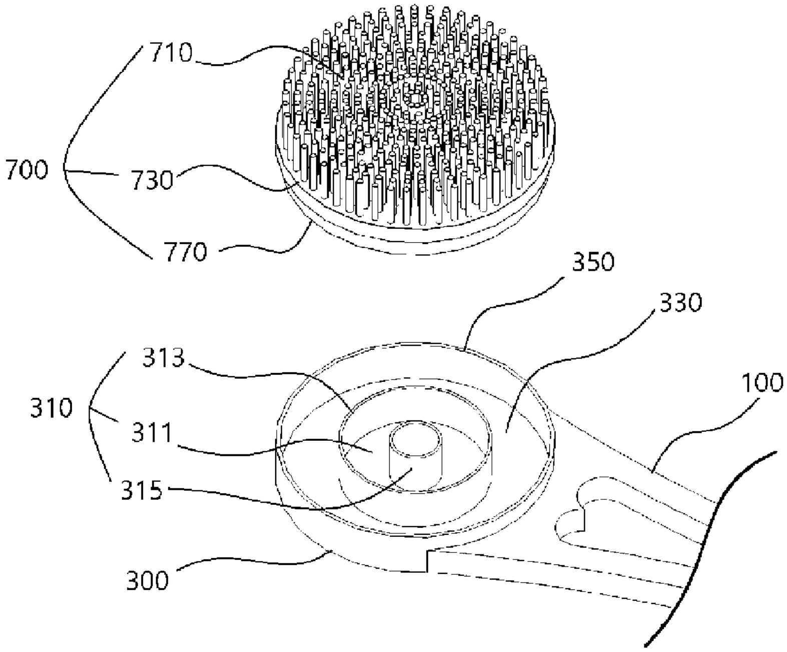
FIG. 10 is an enlarged perspective view of a head portion side in which a brush member is separated from the head portion.
Figure 11:
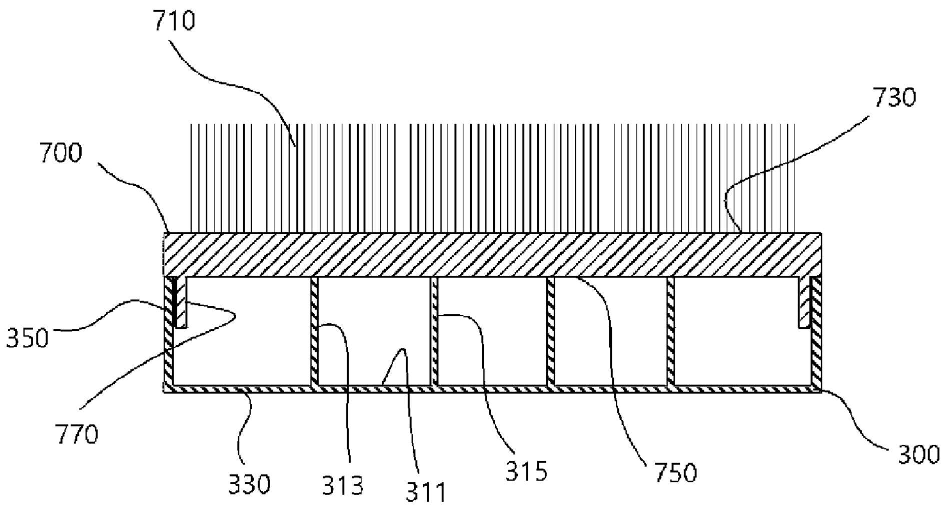
FIG. 11 is a cross-sectional view of the head portion mounted with the brush member.

FIG. 10 is an enlarged perspective view at a side of the head portion 300, in which the brush member 700 is separated from the head portion 300, and FIG. 11 is a cross-sectional view of the head portion 300 mounted with the brush member 700. As shown therein, the brush member 700 includes the fiber 710 and a fiber surface 730 into which the fiber 710 are implanted. The brush member 700 may be manufactured by making a plurality of holes in the fiber surface 730 made of wood or plastic, and implanting hog bristles, horse hairs, or the like fibers 710 in the holes.

The brush member 700 includes a coupling portion 770 extended from a rear 750 at an outer edge of the fiber surface 730 along the height direction. As the coupling portion 770 is inserted in the coupling guide portion 350, the brush member 700 is mounted to the head portion 300.

When the brush member 700 is mounted to the head portion 300, the rear 750 of the fiber surface 730 may come into contact with the upper ends of the coupling guide portion 350, the main lateral wall portion 313, and the inner lateral wall portion 315 to thereby achieve a compact structure. In this case, the upper ends of the coupling guide portion 350, the main lateral wall portion 313 and the inner lateral wall portion 315 are positioned to have the same height, and the rear 350 of the fiber surface 730 forms a flat surface. Thus, in the skin care device with such a compact configuration and structure, the brush member 700 or the massage member 500 can be selectively mounted to the head portion 300.

The invention claimed is:

1. A skin care device comprising:

a handle extended along a lengthwise direction;

a head portion provided at an end portion of the handle, and comprising an accommodating portion in which an accommodating space is formed by a bottom portion and a main lateral wall portion extended from the bottom portion along a height direction; and a massage member detachably mounted to the head portion and comprising a contact surface portion to come into contact with a skin, at least one partition wall extended protruding from a rear of the contact surface portion and dividing the accommodating space into a plurality of accommodating spaces when the massage member is mounted to the head portion, and a plurality of through holes distributed and arranged in the contact surface portion and allowing the plurality of accommodating spaces divided by the at least one partition wall to communicate with the outside, wherein the accommodating portion comprises an inner lateral wall portion extended from the bottom portion along the height direction inside the main lateral wall portion in a radical direction so that the accommodating space can be divided into an outside accommodating space and an inside accommodating space, and the contact surface portion comprises the plurality of through holes so that each of the outside accommodating space and the inside accommodating space can communicate with an outside.

* * * * *